(12) United States Patent
Diatlo et al.

(10) Patent No.: US 8,813,641 B2
(45) Date of Patent: Aug. 26, 2014

(54) SPRAY DISPENSING DEVICE

(71) Applicants: Jordan Diatlo, New York, NY (US); Warren Yan, New York, NY (US); Timothy David Houle, Hazel Park, MI (US); Sandra Lynn O'Neill, Burtchville, MI (US); Timothy Dean O'Neill, Burtchville, MI (US)

(72) Inventors: Jordan Diatlo, New York, NY (US); Warren Yan, New York, NY (US); Timothy David Houle, Hazel Park, MI (US); Sandra Lynn O'Neill, Burtchville, MI (US); Timothy Dean O'Neill, Burtchville, MI (US)

(73) Assignee: Quirky Inc., New York, NY (US)

( * ) Notice: Subject to any disclaimer, the term of this patent is extended or adjusted under 35 U.S.C. 154(b) by 0 days.

(21) Appl. No.: 13/771,893

(22) Filed: Feb. 20, 2013

(65) Prior Publication Data

US 2013/0164423 A1    Jun. 27, 2013

Related U.S. Application Data

(63) Continuation of application No. 13/712,719, filed on Dec. 12, 2012, and a continuation of application No. 13/461,932, filed on May 2, 2012.

(51) Int. Cl.
*A47J 19/02* (2006.01)
*A23N 1/02* (2006.01)
*A23L 2/04* (2006.01)
*B05B 15/00* (2006.01)
*B05B 11/00* (2006.01)

(52) U.S. Cl.
CPC .............. *A47J 19/022* (2013.01); *B05B 15/005* (2013.01); *A47J 19/02* (2013.01); *A23N 1/02* (2013.01); *A23L 2/04* (2013.01); *B05B 11/3043* (2013.01)
USPC ............................ 100/108; 426/116; 426/115

(58) Field of Classification Search
USPC .............. 100/107, 108; 426/115, 116; 99/506
See application file for complete search history.

(56) References Cited

U.S. PATENT DOCUMENTS 1,889,883 A * 12/1932 Cody ............................. 100/108
2,766,792 A * 10/1956 Potter ............................ 99/501
(Continued)

FOREIGN PATENT DOCUMENTS

CN    2388895    7/2000
ES    1074566    5/2011
(Continued)

OTHER PUBLICATIONS

Engstrom, Martha, The Farmers Wife Cookbook, Voyageur Press, 2008, pp. 108.*

(Continued)

*Primary Examiner* — Humera Sheikh
*Assistant Examiner* — Hong T Yoo
(74) *Attorney, Agent, or Firm* — Cowan, Liebowitz & Latman, P.C.; Steven D. Underwood

(57) ABSTRACT

One exemplary aspect comprises a device for spraying liquid, comprising: a liquid extractor having a top portion and a bottom portion, the bottom portion of the liquid extractor adapted to be inserted into a liquid source, the liquid extractor comprising a portion defining a cavity for collecting liquid from the liquid source; and a spray dispenser comprising a top portion and bottom portion, and comprising a spray pump partially disposed within and extending from the top portion of the spray dispenser, the bottom portion of the spray dispenser configured to be coupled with the top portion of the liquid extractor, the spray pump comprising a tube having a lower end disposed within the cavity for collecting liquid from the liquid source. In one or more exemplary embodiments, the bottom portion of the liquid extractor comprises a lower end having a concave surface defining a plurality of openings.

12 Claims, 14 Drawing Sheets

(56) References Cited

U.S. PATENT DOCUMENTS

| | | | |
|---|---|---|---|
| 2,807,205 A * | 9/1957 | Gilman | 100/108 |
| 3,073,237 A * | 1/1963 | Stronstorff et al. | 100/108 |
| 3,381,608 A * | 5/1968 | Bengtsson | 100/108 |
| 4,995,973 A * | 2/1991 | Ballenger et al. | 210/209 |
| 2007/0237864 A1 * | 10/2007 | McCarthy et al. | 426/115 |

FOREIGN PATENT DOCUMENTS

| | | | |
|---|---|---|---|
| FR | 808744 | 2/1937 | |
| FR | 2285815 | 4/1976 | |
| FR | 2813889 | 3/2002 | |
| GB | 2404844 A * | 2/2005 | A47J 19/02 |
| WO | WO 2012/140289 | 10/2012 | |

OTHER PUBLICATIONS

Supplementary European Search Report issued on Jun. 28, 2013, that issued in the corresponding European Patent Application No. 12785962.7.

* cited by examiner

View 1

View 2

BOM List
Product Name: Stem (Juice Sprayer)
Product number: 76010

| Part No | Part Number (class1) | Part Name (class1) | Part Number (class2) | Part Name (class2) | specification | photo | Material (Chinese Name) | Material (English) |
|---|---|---|---|---|---|---|---|---|
| 1 | 76010-1 | Main body | | | White color |  | PP | PP |
| 2 | 76010-2 | bottom body | | | Green | 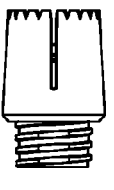 | PP | PP |
| 3 | 76010-3 | Nozzle | | | φ14X15mm, white color, Female |  | PPT 30S | PPT 30S |
| 4 | 76010-4 | inner holder | | | white color |  | Polyformaldehyde | Polyformaldehyde |
| 5 | 76010-5 | Spring φ3.5X22mm | | | φ3.5X22mm | 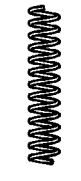 | SS 304H | SS 304H |
| 6 | 76010-6 | ball check valve | | | φ3mm, Clear |  | | |

FIG. 12A

| | | | | | | |
|---|---|---|---|---|---|---|
| 7 | | | | o-ring | 0.8X5mm | | | ○ | SBR Rubber | SBR Rubber |
| 8 | 76010-7 | Valve component | 76010-71 | Inner connector | 26mm Length, Clear | | | PE | PE |
| 9 | | | 76010-72 | Spring φ4.8X10mm | φ4.8X10mm | | | SS 304H | SS 304H |
| 10 | | | 76010-73 | relief bleed valve | φ6X5.6mm | | | PP | PP |
| 11 | | | 76010-74 | inner connector plug | φ4X13mm | | | PP | PP |
| 12 | 76010-8 | suction straw | 76010-75 | | φ2.5X32mm, clear | | | PE | PE |

SPRAY DISPENSING DEVICE

CROSS-REFERENCE TO RELATED APPLICATIONS

This application is a continuation of U.S. patent application Ser. No. 13/712,719, filed Dec. 12, 2012, which is a continuation of U.S. patent application Ser. No. 13/461,932, filed May 2, 2012, entitled "Spray Dispensing Device," which claims priority to U.S. Provisional Patent Application No. 61/486,112, filed May 13, 2011, entitled "Hand-Held Device for Spraying Fruit Juice Directly from the Fruit," and which also claims priority to U.S. Provisional Patent Application No. 61/565,410, filed Nov. 30, 2011, entitled "Spray Dispensing Device." The entire contents of each of the above-referenced applications are incorporated herein by reference.

INTRODUCTION

Exemplary embodiments described herein relate generally to a device for spraying a liquid. Certain exemplary embodiments described herein relate to a device for spraying fruit juice directly from a fruit, vegetable, berry, or other liquid source (for brevity, "fruit").

Known methods for obtaining juice from a citrus fruit often include cutting the peel of a citrus fruit and/or cutting the citrus fruit in half and squeezing the fruit. With such known methods it can be difficult to avoid getting juice on one's hands. In some cases, only a small amount of fruit juice may be needed as an ingredient in cooking. In such instances, it can be difficult to obtain a small amount of juice and/or obtain juice in small particles (e.g., a spray or atomization) by such known methods. Furthermore, the juice may need to be filtered to remove seeds and/or pulp from the juice.

Thus, a need exists for an improved apparatus and methods for spraying fruit juice directly from the fruit. Exemplary aspects and embodiments are described herein.

One exemplary aspect comprises a device for spraying liquid, the device comprising: a liquid extractor having a top portion and a bottom portion, the bottom portion of the liquid extractor adapted to be inserted into a liquid source, the liquid extractor comprising a portion defining a cavity for collecting liquid from the liquid source; and a spray dispenser comprising a top portion and bottom portion, and comprising a spray pump partially disposed within and extending from the top portion of the spray dispenser, the bottom portion of the spray dispenser configured to be coupled with the top portion of the liquid extractor, the spray pump comprising a tube having a lower end disposed within the cavity for collecting liquid from the liquid source.

In one or more exemplary embodiments: (1) the liquid source is at least one of a fruit, vegetable, and berry, and the spray dispenser is operable to spray juice extracted from the at least one of a fruit, vegetable, and berry; (2) the bottom portion of the liquid extractor comprises a lower end having a concave surface defining a plurality of openings; (3) the lower end of the liquid extractor defines a serrated edge; (4) the bottom portion of the liquid extractor defines a plurality of channels for guiding liquid into the cavity; (5) the liquid extractor further comprises a filter disposed within the cavity and configured to prevent particles of a fruit from flowing into the cavity; (6) the filter is removable; (7) the device comprises a surface extending substantially perpendicular to an axis passing through the cavity and the spray dispenser, thereby defining an insertion stop point for inserting the device into at least one of a fruit, vegetable, and berry; (8) the top portion of the spray dispenser flares towards the bottom portion, the flared portion having a diameter larger than a diameter of the lower end of the spray dispenser and a bottom surface of the flared portion forming the insertion stop point; (9) the spray pump further comprises a pump activator having a spray outlet, the pump activator configured to be pressed to cause liquid collected within the cavity to flow within the tube of the spray pump toward the spray outlet for distribution; (10) the spray dispenser and the liquid extractor are detachably coupled; (11) the spray dispenser and the liquid extractor are detachably coupled via a threaded coupling; and/or (12) the liquid source is a fruit, and the spray dispenser is operable to spray juice extracted from the fruit by the liquid extractor.

Another exemplary aspect comprises a method for spraying a liquid, comprising: (a) inserting an embodiment of the device into a juice source to collect juice; (b) directing a spray outlet of the device in a desired direction; and (c) pressing a pump activator to cause juice collected within the cavity of the device to flow within the tube of the spray pump toward a spray outlet for spraying the juice in the desired direction.

In one or more exemplary embodiments, the step of inserting comprises rotating a lower end of a juice extractor portion having a serrated edge, so that the serrated edge penetrates a peel region of the juice source and the cavity is filled with juice.

Another exemplary aspect comprises a method comprising decoupling the liquid extractor of an embodiment from the spray dispenser; and cleaning the liquid extractor of an embodiment to remove liquid or debris. In one or more exemplary embodiment: (1) a source of the liquid or debris is at least one of a fruit, vegetable, and berry; and/or (2) the method comprises cleaning a filter to remove liquid or debris.

Another exemplary aspect comprises a method comprising coupling the liquid extractor of an embodiment to the spray dispenser of an embodiment. In one or more exemplary embodiments coupling the liquid extractor of an embodiment to the spray dispenser of an embodiment is performed via a threaded coupling.

Other exemplary aspects and embodiments will be apparent from the drawings and description below.

BRIEF DESCRIPTION OF THE DRAWINGS

FIGS. 12A and 12B provide an exemplary parts list.

DETAILED DESCRIPTION OF CERTAIN EXEMPLARY EMBODIMENTS

Certain exemplary embodiments described herein comprise a spray device that is inserted directly into a fruit, vegetable, berry, or other liquid source (again, for brevity, "fruit"). The spray device facilitates the spraying of juice directly from the fruit, thus avoiding the limitations of the procedures described above.

Figure 1:
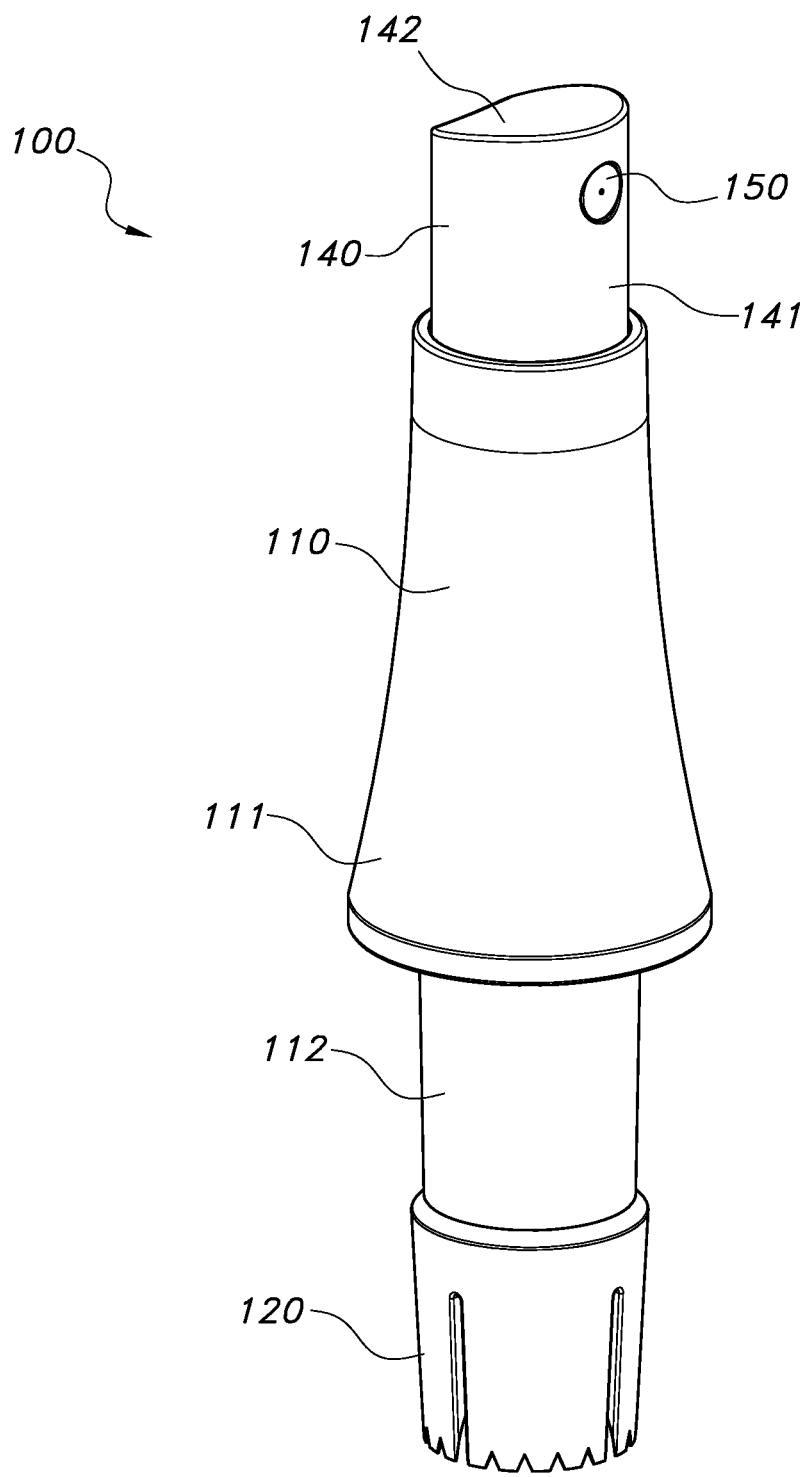
FIG. 1 is a perspective view of a spray device, according to an exemplary embodiment.

FIGS. 1-4 illustrate a spray device 100, according to an exemplary embodiment. As shown in FIG. 1, the spray device 100 may include a body 110, an actuator 140, a pump 160, and an engagement member 120. The body 110 may include a flared portion 111, configured to couple to the actuator 140, and a neck 112, configured to couple to the engagement member 120. The body 110 may further include an inner surface 115 that defines a channel 116 and receives the pump 160 therebetween. Similarly stated, the pump 160 may be at least partially disposed within the channel 116 defined by the inner surface 115 of the body 110.

The body 110 may be any appropriate shape, size, or configuration. For example, as shown in FIG. 1, the flared portion 111 of the body 110 may include a first end (e.g., a top end) that defines a first diameter, and a second end (e.g., a bottom end) that defines a second diameter substantially larger than the first diameter. In this manner, the flared portion 111 may define an ergonomic shape such that a user's hand can easily grasp the flared portion 111. Similarly stated, the flared portion 111 can define a surface that prevents further insertion of the spray device 100 into a citrus fruit. That is, the flared portion prevents the product from being inserted too far into the fruit.

While the surface is shown in FIG. 1 as substantially smooth, the body 110 can define any suitable surface. For example, in some embodiments, the flared portion 111 may include a grip with ridges and/or protrusions configured to engage a user's hand or fingers.

The body 110 may be formed of any suitable material, such as, for example, a plastic, thermoplastic, polymer, ceramic, metal, glass, and/or any combination thereof. Additionally, the flared portion 111 may include any suitable surface treatment, such as, for example, a textured surface to increase the friction between a user's hand and the flared portion 111.

The neck 112 may be configured to extend from the flared portion 111. While depicted in FIG. 1 as defining a smaller diameter than the flared portion 111, the neck 112 may define any suitable size or shape. For example, in some embodiments, the neck 112 may be wider than the flared portion 111. Alternatively, in other embodiments, the neck 112 may have other cross-sections including, for example, oval, square, rectangular, etc.

Figure 2:
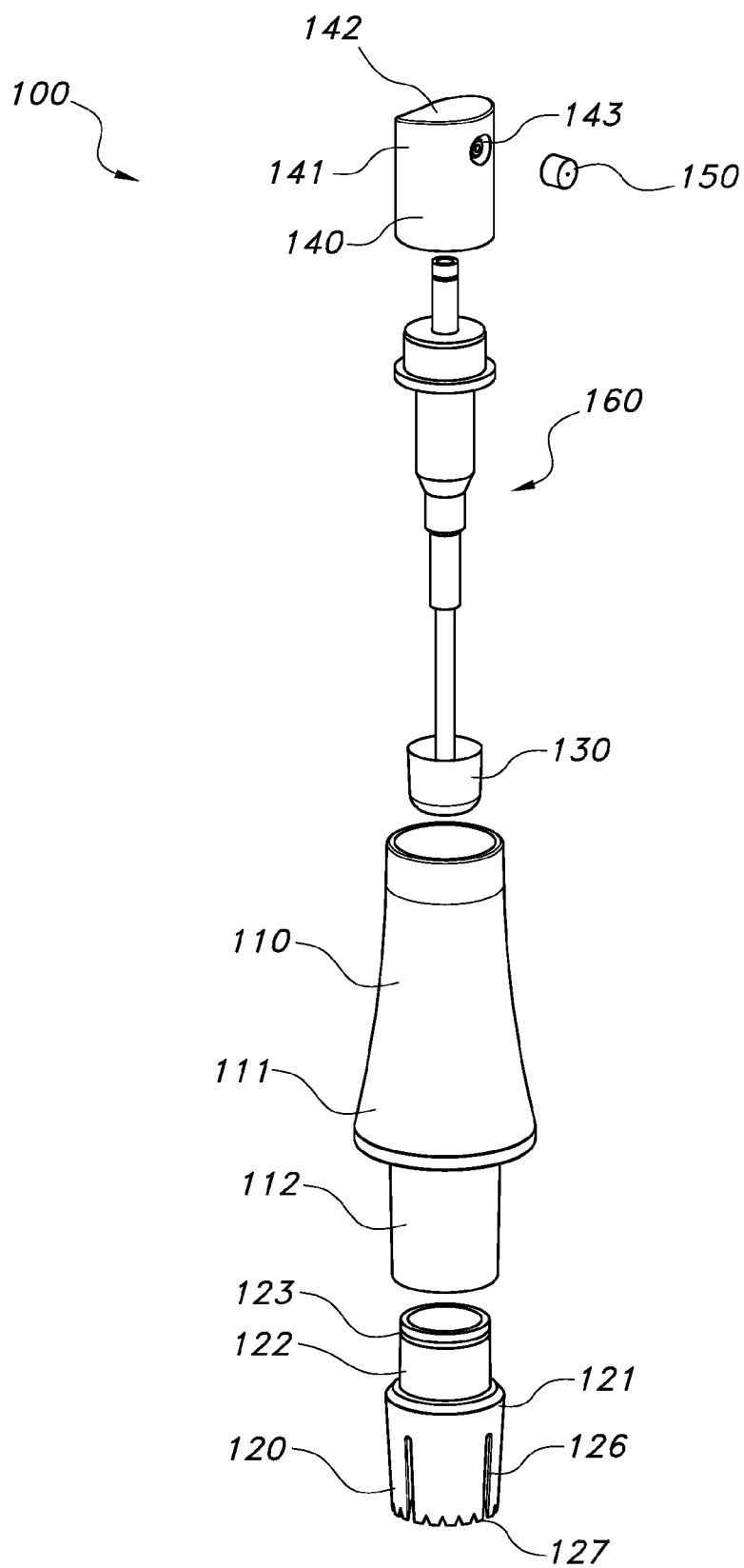
FIG. 2 is an exploded view of the spray device of FIG. 1.
Figure 3:
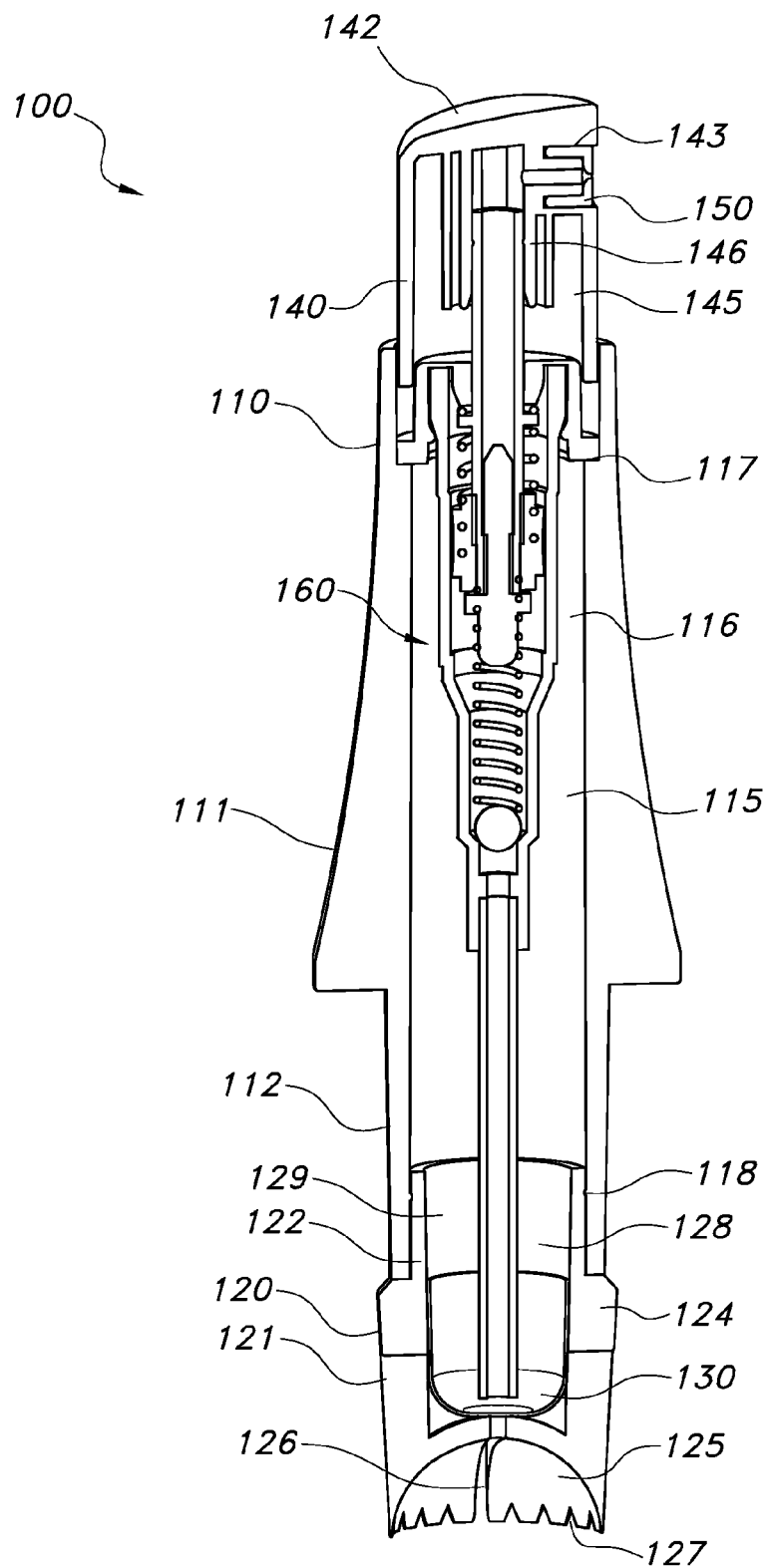
FIG. 3 is a cross-sectional view of the spray device of FIG. 1.

Referring to FIG. 2, an actuator 140 may be configured to be operative coupled to the body 110. More specifically, actuator 140 may include an outer surface 141 configured to be inserted into the channel 116 defined by the inner surface 115 of the body 110. Additionally, an inner surface 145 of the actuator 140 may include an annular protrusion 146 that extends from a top portion of the inner surface 115 (see FIG. 3). The annular protrusion 146 may be configured to receive a portion of the pump 160. In this manner, the actuator 140 may be coupled to the pump 160 and either or both may be disposed within the body 110.

The outer surface 141 of the actuator 140 may include an engagement portion 142. The engagement portion 142 may define an ergonomic shape configured to receive a user's finger. In this manner, the user can depress the actuator 140 to actuate the spray device 100.

Additionally, the actuator 140 may include an outlet portion 143 configured to receive a nozzle 150. The nozzle 150 may be any suitable nozzle configured to spray a liquid. In some embodiments, the nozzle 150 may be integrally formed with the actuator 140. Similarly stated, in some embodiments, the outlet portion 143 of the actuator 140 may define an orifice configured to deliver a spray of a fluid.

As described above, the pump 160 may be at least partially disposed within the body 110 of the spray device 100. The pump 160 can be coupled to the body 110 in any suitable manner. For example, the inner surface 115 of the body 110 may define an upper seat 117 configured to engage a portion of the pump 160. In some embodiments, the pump 160 may define a friction fit with the inner surface 115 of the body 110. In other embodiments, the pump 160 and the body 110 may define a threaded coupling. The pump 160 may be any suitable pump 160 configured to deliver a spray of a liquid. For example, in some embodiments, the pump 160 may be a positive displacement pump.

In some embodiments, the pump 160 may be configured to deliver a fluid to an outlet and/or outlet portion in response to a negative pressure differential. For example, the pump 160 may be actuated such that air and/or fluid within a chamber is expelled. The expulsion of the air and/or fluid may cause a negative pressure to exist such that the pump 160 draws a fluid through a suction tube into the chamber. In some embodiments, the pump 160 may include a valve assembly configured to open and close in response to the actuator 140. For example, in some embodiments, the pump 160 may be configured such that when the actuator 140 is depressed by a user the valve opens to deliver a fluid.

As described above, engagement member 120 may be configured to be coupled to the neck 112 of the body 110. More specifically, engagement member 120 may include an extension 122 configured to be inserted into the neck 112 of the body 110. The engagement member 120 may include an outer surface 121 that defines an annular slot 123 (see FIG. 4) configured to engage an annular protrusion 118 defined by the inner surface 115 of the body 110. Therefore, when the extension 122 of the engagement member 120 is inserted into the neck 112 of the body 110, the annular slot 123 may receive the annular protrusion 118. In this manner, engagement member 120 may be coupled to the body 110.

In some embodiments, an annular protrusion 118 may be formed of a material defining a high friction coefficient, such as, for example, polypropylene (PP). In other embodiments, an annular protrusion 118 may be any suitable material and may be formed as an over mold (e.g., the body 110 is formed of a given material and the annular protrusion 118 is formed of a second material, molded on top of the first material). In still other embodiments, engagement member 120 may be coupled to the neck 112 of the body 110 using a threaded coupling. In such embodiments, engagement member 120 may be coupled to and decoupled from the body 110 by twisting the engagement portion 120 relative to the body 110. Alternatively, engagement member 120 may be integrally formed with the body 110 (e.g., engagement member 120 may be formed together with the body 110).

Figure 4:
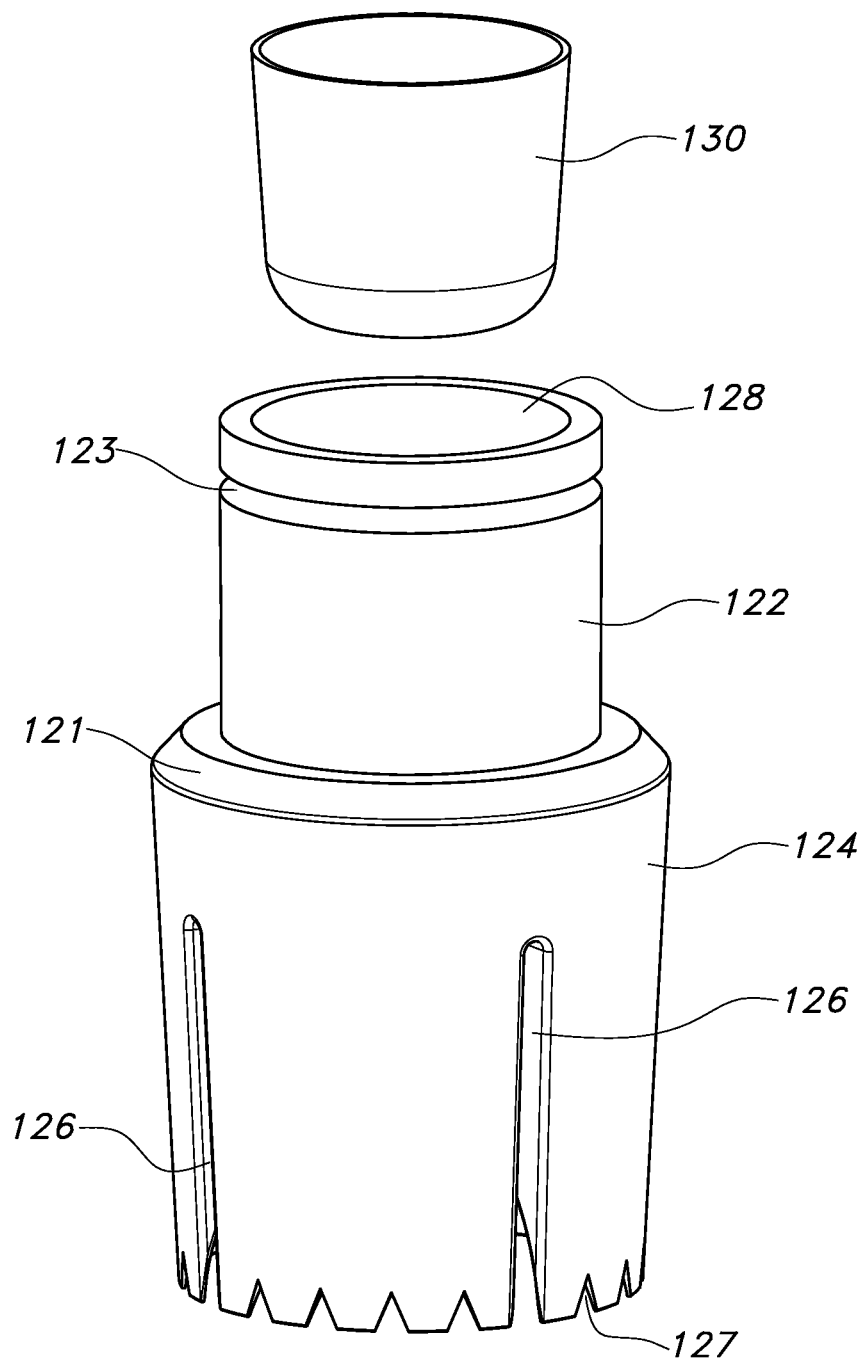
FIG. 4 is a perspective view of a portion of the spray device of FIG. 1.

Engagement member 120 may include an engagement portion 124 (see FIG. 4). The engagement portion 124 may be configured to be inserted into the citrus fruit. More specifically, the engagement portion 124 may includes a serrated end surface 127 configured to cut the peel of a citrus fruit such that the engagement portion 124 may be inserted into the citrus fruit. Additionally, the engagement portion 124 may include a concave surface 125 configured to receive a portion of the peel disposed within the engagement portion 124. Similarly stated, the concave surface 125 may be configured to allow the serrated end surface 127 to extend beyond the peel.

With the engagement portion 124 inserted into the citrus fruit, the actuator 140 may be actuated such that the pump 160 transfers a suction force to the citrus fruit. The engagement portion 124 may include a set of passages 126 configured to allow the juice within the fruit to enter the engagement portion 124. More specifically, as juice is transferred through the passages 126, the juice can enter a channel 129 defined by an inner surface 128 of the engagement member 120 (see FIG. 3). The channel 129 may include a filter 130 configured to filter the juice of pulp, seeds, and/or debris before entering a suction tube included in the pump 160. The filter 130 may be any suitable filter such as, for example, a mesh filter 130.

In such embodiments, the mesh filter 130 may define any suitable mesh size configured to allow for a given flow rate of juice through the filter and may be made from metal, plastic, or any other suitable material. While depicted in FIGS. 3 and 4 as substantially thimble shaped, the filter 130 may be any suitable shape.

For example, in some embodiments, the filter may be a flat disc, a conical filter, a frustoconical filter, a convex/concave filter, and/or any other suitable filter. In this manner, the juice contained in the citrus fruit may be transferred to the pump 160 and delivered through the nozzle 150. In some embodiments, the mesh filter 130 may be removed to be cleaned. For example, a user may remove the engagement member 120 from the body 110 by twisting the engagement portion 120 relative to the body 110 to rinse the filter 130 of pulp, seeds, or other debris. After the filter 130 is cleaned or replaced, it may be inserted back into the engagement portion 120 and re-coupled to the body 110. In some embodiments, the filter 130 may be integrally formed with the body 110 and/or the engagement member 120.

Figure 10:
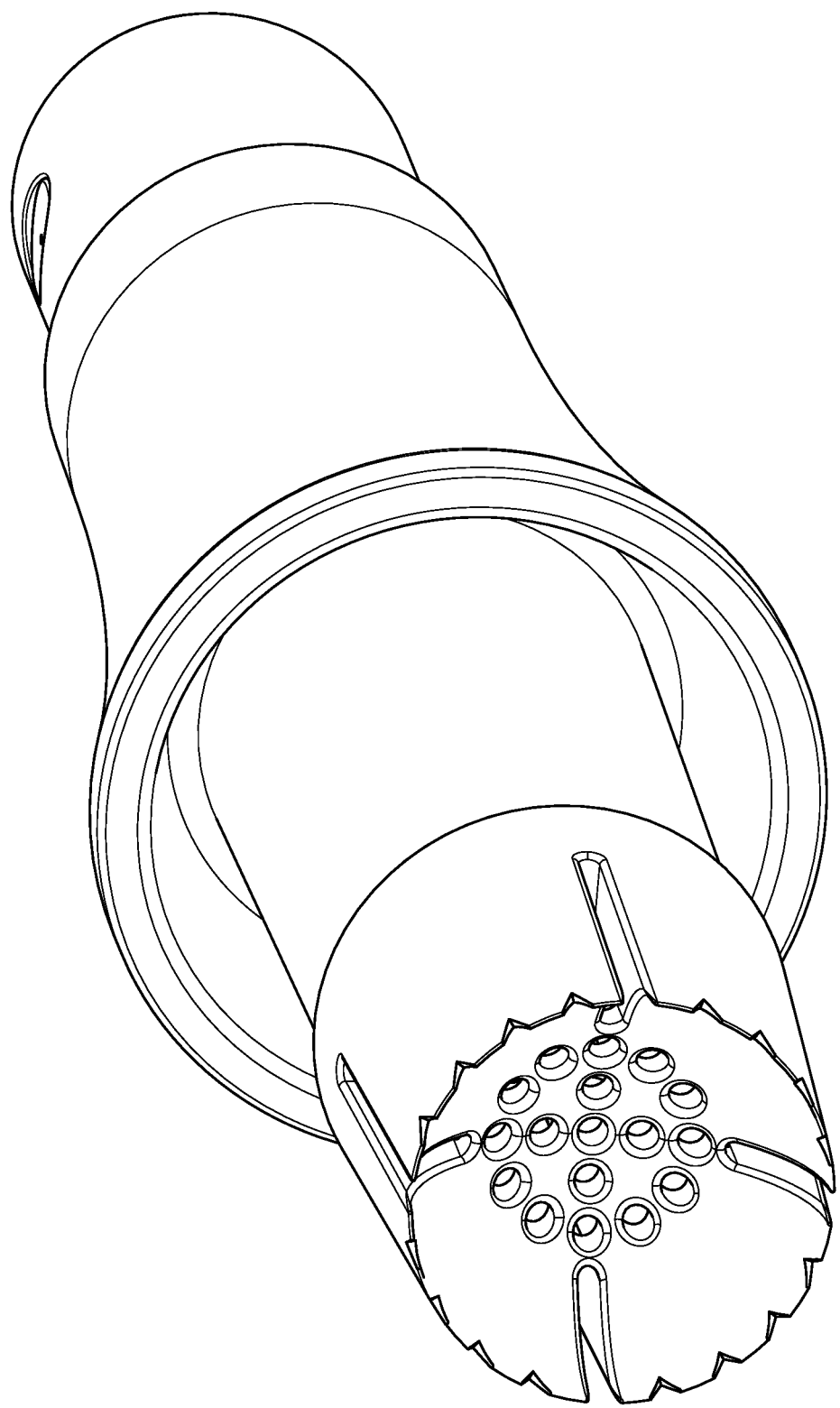
Figure 11:
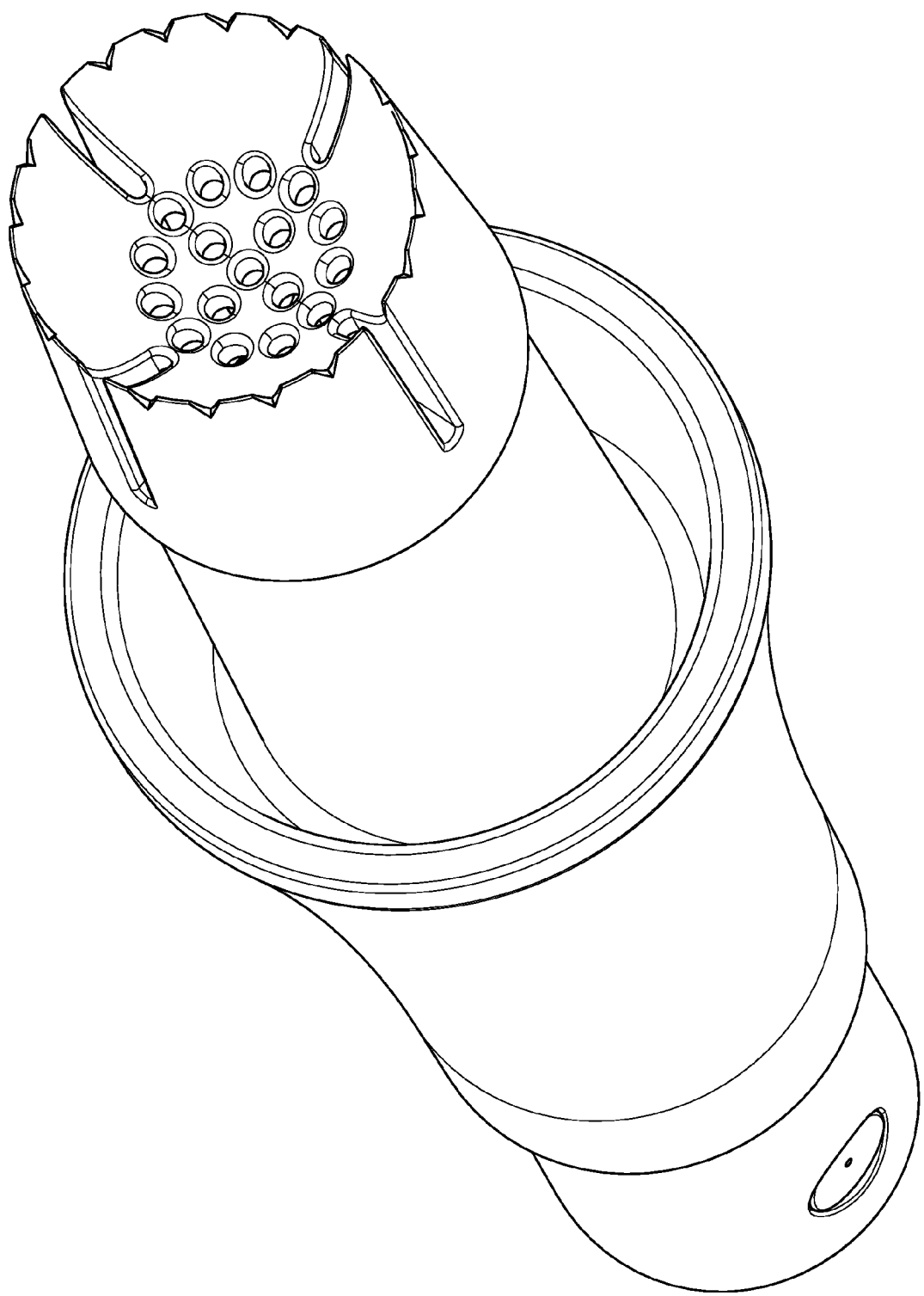
Figure 13:
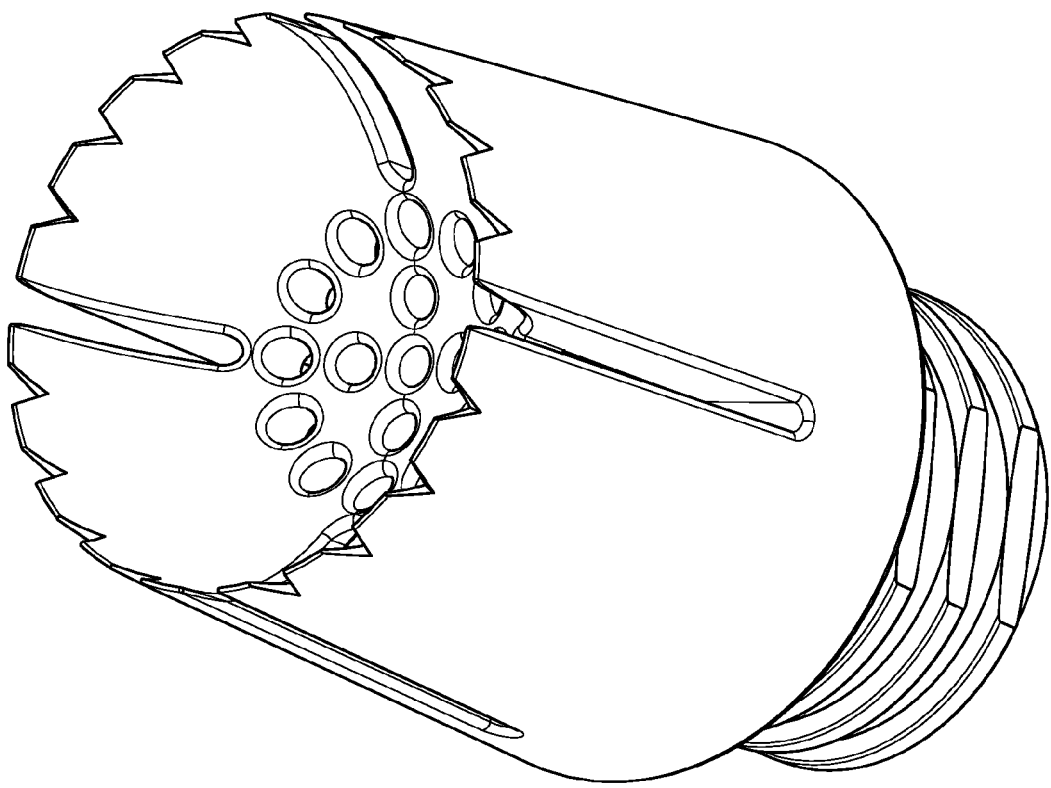
FIG. 13 provides an alternate view of a bottom portion of a liquid extractor of an exemplary embodiment.

In certain embodiments, instead of or in addition to using a separate filter piece, functionality of a filter may be achieved using a set of perforations in a bottom portion of a juice extractor component (see, for example, FIGS. 10, 11, and 13).

In certain exemplary embodiments, inserting of a bottom portion of the spray device, such as the engagement portion 124 (FIGS. 1-4), directly into a fruit (or vegetable, berry, etc.), may cause juice to flow from the fruit into a cavity, such as a channel 129 (FIG. 3), defined within the body of the spray device. Then, resulting from depressing of a pump activator (e.g., actuator 140, FIG. 3) of a pump (e.g., 160, FIG. 3), a suction force may cause the juice collected within the cavity to be transferred, via a pump tube, up towards the pump activator, and released via a nozzle (e.g., 150, FIG. 2) in small particles, such as a mist.

Directing of the nozzle in a desired direction enables the user of the spray device to control the direction of the mist. The lower portion of the spray device may define one or more channels, such as passages 126 (FIGS. 2-4), and/or a concave end with a plurality of openings to facilitate and/or guide the flow of the fruit juice into the cavity upon insertion of the spray device into the fruit. Although FIGS. 1-4 depict the spay device including four channels, fewer or more channels may be formed within the lower portion of the spray device.

Another exemplary embodiment comprises a hand-held device for spraying fruit juice directly from a fruit, vegetable, berry, or other liquid source. The device comprises two parts: an aerosol spray pump component and a juice extractor component (see FIG. 5). The aerosol spray pump component includes a pump, a pump activator, an aerosol port, a siphon tube, and a threaded collar. The juice extractor component includes a threaded end, a hollow body part, a solid body part with channels, and a serrated end.

The pump used in this exemplary embodiment may be cylindrical in shape and made of hard plastic. The siphon tube may be made from a hollow, flexible plastic tube and extend from one end of the pump. The pump activator may be cylindrical in shape and made of hard plastic; and may be integrated with the end of the pump opposite that of the siphon tube. The circular aerosol port may be integrated into the annular surface of the pump activator. The threaded collar may be a short, hollow cylinder made of hard plastic with a diameter that is greater than that of the pump.

The interior surface of the threaded collar may be threaded like a screw. One end of the threaded collar may be closed and attached to the exterior surface of the pump where the pump meets the pump activator, while the other end may be open and encompass the pump. The juice extractor may be a tube shaped cylinder that is hollow on one half and solid on the other half, having a diameter that is slightly less than that of the threaded collar, but more than that of the pump.

All parts of the juice extractor may be made from hard plastic, may be cylindrical, and may be formed from the same piece of material. One end of the hollow body part may be threaded like a screw on the exterior surface, comprising the threaded end. The opposing end of the hollow body part integrates with the remaining half of the juice extractor, the solid body part. Two channels may be cut perpendicular to each other through the entirety of the solid body part, resulting in four coaxial channels spaced at right angles to each other.

Figure 5:
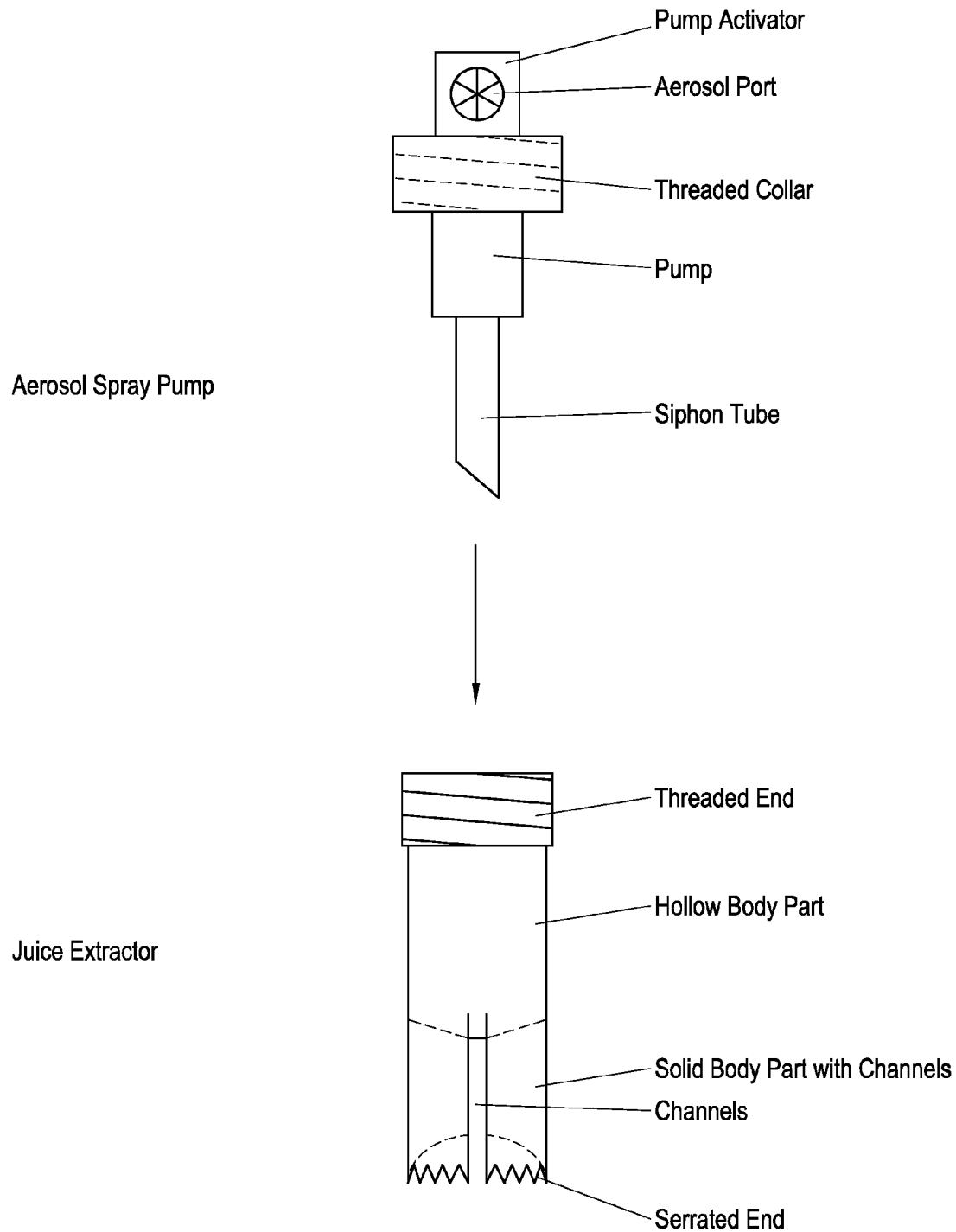
FIG. 5 is a perspective view showing two components of an exemplary embodiment.
Figure 6:
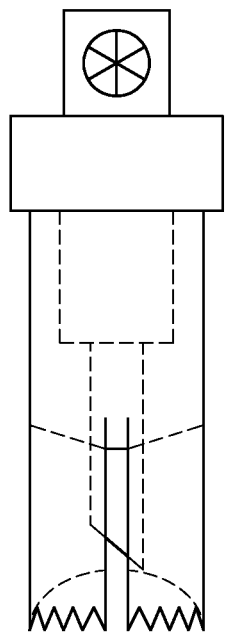
FIG. 6 depicts two views of a juice extractor component of the embodiment depicted in FIG. 5.
Figure 6:
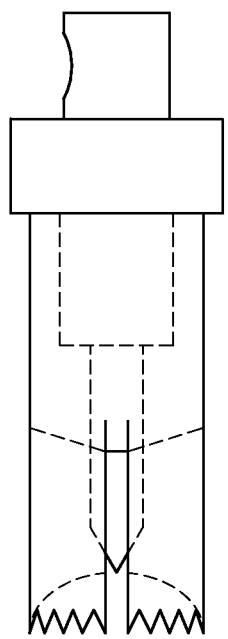

The end of the solid body part opposite that integrated to the hollow body part may be concave and serrated, forming the serrated end. The threaded collar of the aerosol spray pump may be joined to the threaded end of the juice extractor with a twisting motion, with the pump fitting into the hollow body part and the siphon tube fitting and reaching half-way into the solid body part with channels (FIGS. 5 and 6).

Another exemplary aspect comprises two parts: means for spraying juice and means for extracting juice. The means for spraying juice may include means for pumping juice, means to operate a pump, means of exit of aerosol, means of juice uptake, and means to connect to the means for extracting juice.

The means for extracting juice may include means to connect to the means for spraying juice, means to accommodate the pump, means to allow juice flow, and means to pierce the fruit. The means for pumping juice may be cylindrical in shape and made of hard plastic.

The means of juice uptake may be made from a hollow, flexible plastic tube and extend from one end of the means for pumping juice. The means to operate a pump may be cylindrical in shape and made of hard plastic; and may be integrated with the end of the means for pumping juice opposite that of the means of juice uptake. The means of exit of aerosol may be integrated into the annular surface of the means to operate the pump.

The means to connect to the means for extracting juice may be a short, hollow cylinder made of hard plastic with a diameter that is greater than that of the means for pumping juice. The interior surface of the means to connect to the means for extracting juice may be threaded like a screw. One end of the means to connect to the means for extracting juice may be closed and attached to the exterior surface of the means for pumping juice where the means for pumping juice meets the means to operate the pump, while the other end may be open and encompass the means for pumping juice. The means for extracting juice may be a tube shaped cylinder that is hollow on one half and solid on the other half, having a diameter that is slightly less than that of the means to connect to the means for extracting juice, but more than that of the means for pumping juice.

All parts of the means for extracting juice may be made from hard plastic, may be cylindrical, and may be formed from the same piece of material. One end of the means to accommodate pump may be threaded like a screw on the exterior surface, comprising the means to connect to the means for spraying juice. The opposing end of the means to accommodate pump may be integrated with the remaining half of the means for extracting juice, the means to allow juice flow.

Two channels may be cut perpendicular to each other through the entirety of the means to allow juice flow, resulting in four coaxial channels spaced at right angle to each other. The end of the means to allow juice flow opposite that is integrated to the means to accommodate pump may be concave and serrated, forming the means to pierce the fruit. The means to connect to the means for extracting juice may be joined to the means to connect to the means for spraying juice with a twisting motion, with the means for pumping juice fitting into the means to accommodate pump and the means of juice uptake fitting and reaching half-way into the means to allow juice flow.

Figure 7:
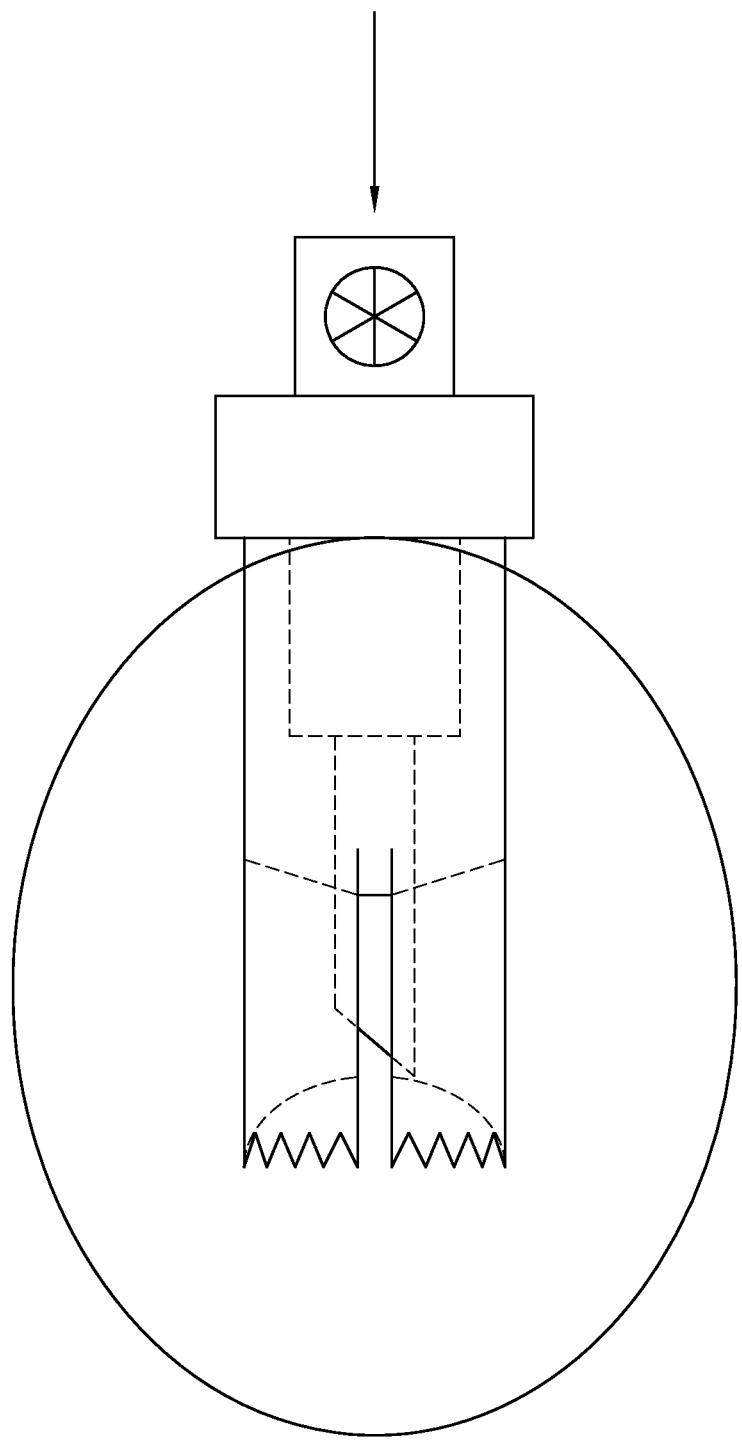
FIG. 7 depicts an exemplary use of the device of FIG. 5.
Figure 8:
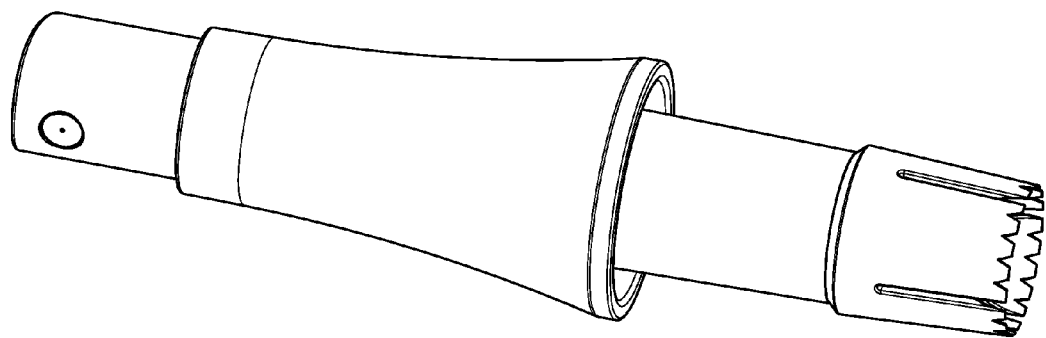
FIGS. 8-11 are perspective views of exemplary embodiments.
Figure 9:
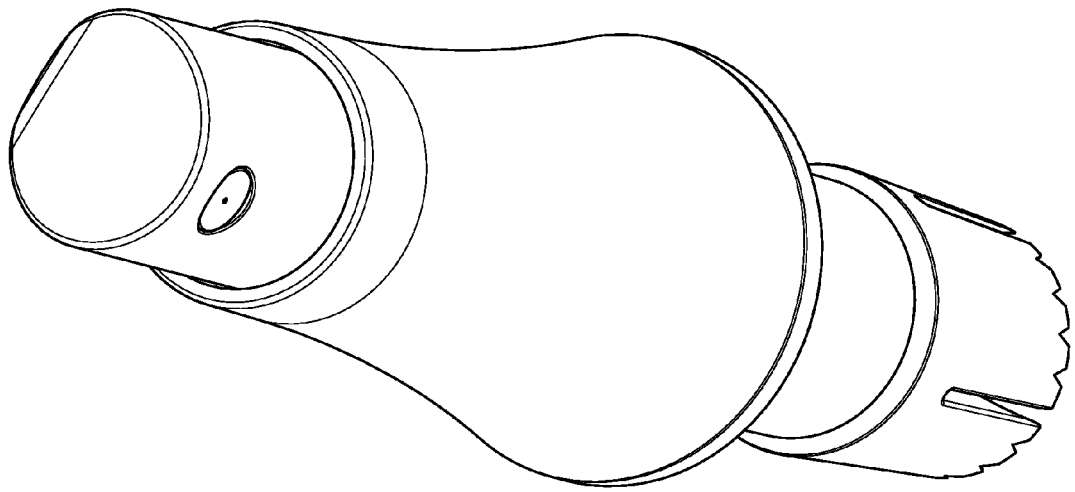

In operation, a user may, for example, roll a piece of citrus fruit on a hard surface while applying pressure to loosen the interior. The serrated end of the invention may then be inserted with a twisting motion through the skin of the fruit and into the interior flesh, preferably through the area of the fruit where the stem was once attached. The user may then use a finger to operate the aerosol pump by pressing down on the pump activator. Juice will exit in aerosol form from the aerosol port (see FIG. 7).

FIGS. 8-11 are perspective views of exemplary embodiments.

Figure 12B:
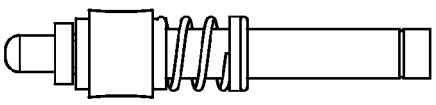

FIGS. 12A and 12B comprise a parts list that may be used to purchase certain component parts to construct an exemplary embodiment. The parts supplier in this case is ZheJiang YuYao City ZhiBing Spray Factory, in China.

The parts list in FIGS. 12A and 12B is provided for informational and enablement purposes only, and does not constitute, and is not intended to provide, any sort of implied license to practice the claimed invention.

While certain exemplary embodiments are described herein, it should be understood that those embodiments are presented by way of example only, and not limitation. While the embodiments have been particularly shown and described, it will be understood that various changes in form and details may be made. Although various embodiments have been described as having particular features and/or combinations of components, other embodiments are possible having a combination of any features and/or components from any of embodiments as discussed above.

We claim:

1. A device for spraying juice, the device comprising:
 a juice extractor having a top portion and a bottom portion, the bottom portion of the juice extractor having an edge that is inserted into a skin of a fruit, the juice extractor containing a cavity for collecting juice directly from the fruit, said edge enclosing an external surface having a plurality of openings through which pulp and seeds larger than each of said plurality of openings do not pass and juice flows and collects in said cavity; and
 a spray dispenser comprising a top portion and bottom portion, and comprising a spray pump partially disposed within and extending from the top portion of the spray dispenser, the bottom portion of the spray dispenser detachably coupled with the top portion of the juice extractor, the spray pump comprising a tube having a lower end disposed within the cavity and terminating within a void enclosed by said external surface, for collecting juice directly from the fruit.

2. A device as in claim 1, wherein said external surface comprises a concave surface defining the plurality of openings.

3. A device as in claim 2, wherein the edge comprises a serrated edge.

4. A device as in claim 1, wherein the juice extractor further comprises a filter disposed within the cavity and configured to prevent particles of the fruit from flowing into the cavity.

5. A device as in claim 4 wherein said filter is removable.

6. A device as in claim 1, wherein the device comprises a surface extending substantially perpendicular to an axis passing through said cavity and said spray dispenser, thereby defining an insertion stop point for inserting the device into said fruit.

7. A device as in claim 6, wherein the top portion of the spray dispenser flares towards the bottom portion, the flared portion having a diameter larger than a diameter of a lower end of the spray dispenser and a bottom surface of the flared portion forming said insertion stop point.

8. A device as in claim 1, wherein the spray pump further comprises:
 a pump activator having a spray outlet, the pump activator configured to be pressed to cause juice collected within the cavity to flow within the tube of the spray pump toward the spray outlet for distribution.

9. A device as in claim 1, wherein the spray dispenser and the juice extractor are detachably coupled via a threaded coupling.

10. A device as in claim 1, wherein at least one portion of said juice extractor is threaded like a screw on an exterior surface.

11. A device as in claim 1, wherein the spray pump when activated applies a suction force to said fruit.

12. A device as in claim 1, wherein said juice extractor is cylindrical, with the top portion removably connected to said spray dispenser, and the external surface of the bottom portion having the plurality of openings that allow the juice to flow into said cavity being concave.

* * * * *